(12) United States Patent   (10) Patent No.: US 7,637,467 B2
Lai et al.   (45) Date of Patent: Dec. 29, 2009

(54) STAND FOR SUPPORTING COMPUTER

(75) Inventors: Hsiu-Chang Lai, Taipei Hsien (TW); Zheng-Heng Sun, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 119 days.

(21) Appl. No.: 11/863,272

(22) Filed: Sep. 28, 2007

(65) Prior Publication Data

US 2008/0117582 A1  May 22, 2008

(30) Foreign Application Priority Data

Nov. 17, 2006   (CN) .................... 2006 1 0156905

(51) Int. Cl.
*A47B 91/00* (2006.01)

(52) U.S. Cl. .............. 248/346.01; 361/679.01

(58) Field of Classification Search ............ 211/184; 248/346.01, 346.03, 346.07, 918, 448; 361/679.01, 361/379.3; 439/929; 320/113; 455/90.3
See application file for complete search history.

(56) References Cited

U.S. PATENT DOCUMENTS

| | | | | |
|---|---|---|---|---|
| 4,629,962 A | * | 12/1986 | Arakawa | 320/113 |
| 4,816,735 A | * | 3/1989 | Cook et al. | 320/110 |
| 5,269,600 A | * | 12/1993 | Arreola et al. | 312/348.3 |
| 6,124,699 A | * | 9/2000 | Suzuki et al. | 320/110 |
| 6,471,081 B1 | * | 10/2002 | Weiler | 211/184 |
| 7,455,267 B2 | * | 11/2008 | Kim | 248/65 |
| 2003/0189018 A1 | * | 10/2003 | Hopkins et al. | 211/90.02 |

* cited by examiner

*Primary Examiner*—Amy J Sterling
(74) *Attorney, Agent, or Firm*—Frank R. Niranjan

(57) ABSTRACT

A stand for supporting a computer enclosure includes a bracket, a support member, and a securing member. The bracket includes a first fixing portion and a second fixing portion at opposite ends thereof. The first fixing portion includes a first sidewall extending up and located at a side of the bracket. The second fixing portion includes a horizontal supporting plate extending toward the first fixing portion, configured for supporting an end of the computer enclosure thereon. The support member is perpendicularly fixed to an inner surface of the first sidewall of the first fixing portion of the bracket with one end thereof, for supporting an opposite end of the computer enclosure thereon. The securing member is slidably attached to the support member, and together with the first sidewall of the first fixing portion of the bracket sandwiching the computer enclosure.

18 Claims, 5 Drawing Sheets

STAND FOR SUPPORTING COMPUTER

BACKGROUND

1. Field of the Invention

The present invention relates to stands, and particularly to a stand stably supporting a computer enclosure and a power supply.

2. Description of Related Art

Currently, due to a compact size trend, computer enclosures are becoming ever smaller, and can no longer accommodate power supplies therein. Therefore, the power supply is located outside the computer enclosure. However, the power supply is often loosely placed beside the computer enclosure, which is untidy and inconvenient.

What is needed is to provide a stand which stably supports a computer enclosure and a power supply together.

SUMMARY

In one embodiment, a stand for supporting a computer enclosure includes a bracket, a support member, and a securing member. The bracket includes a first fixing portion and a second fixing portion at opposite ends thereof. The first fixing portion includes a first sidewall extending up and located at a side of the bracket. The second fixing portion includes a horizontal supporting plate extending toward the first fixing portion, configured for supporting an end of the computer enclosure thereon. The support member is perpendicularly fixed to an inner surface of the first sidewall of the first fixing portion of the bracket with one end thereof, for supporting an opposite end of the computer enclosure thereon. The securing member is slidably attached to the support member, and together with the first sidewall of the first fixing portion of the bracket sandwiching the computer enclosure.

Other advantages and novel features of the present invention will become more apparent from the following detailed description of an embodiment when taken in conjunction with the accompanying drawings, in which:

DETAILED DESCRIPTION

Figure 1:
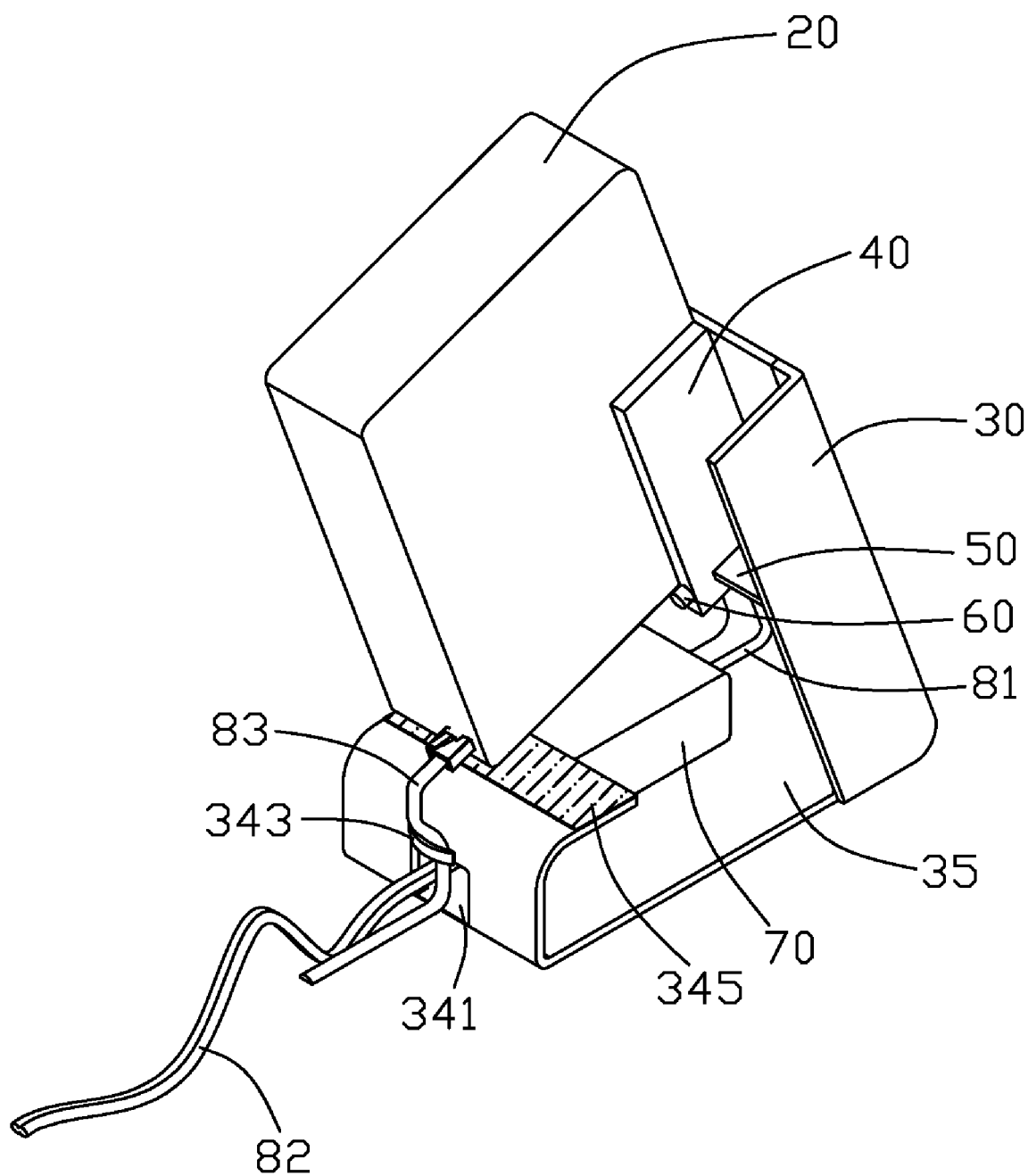
FIG. 1 is an assembled, isometric view of a stand in accordance with an embodiment of the present invention, together with a computer enclosure, and a power supply.
Figure 2:
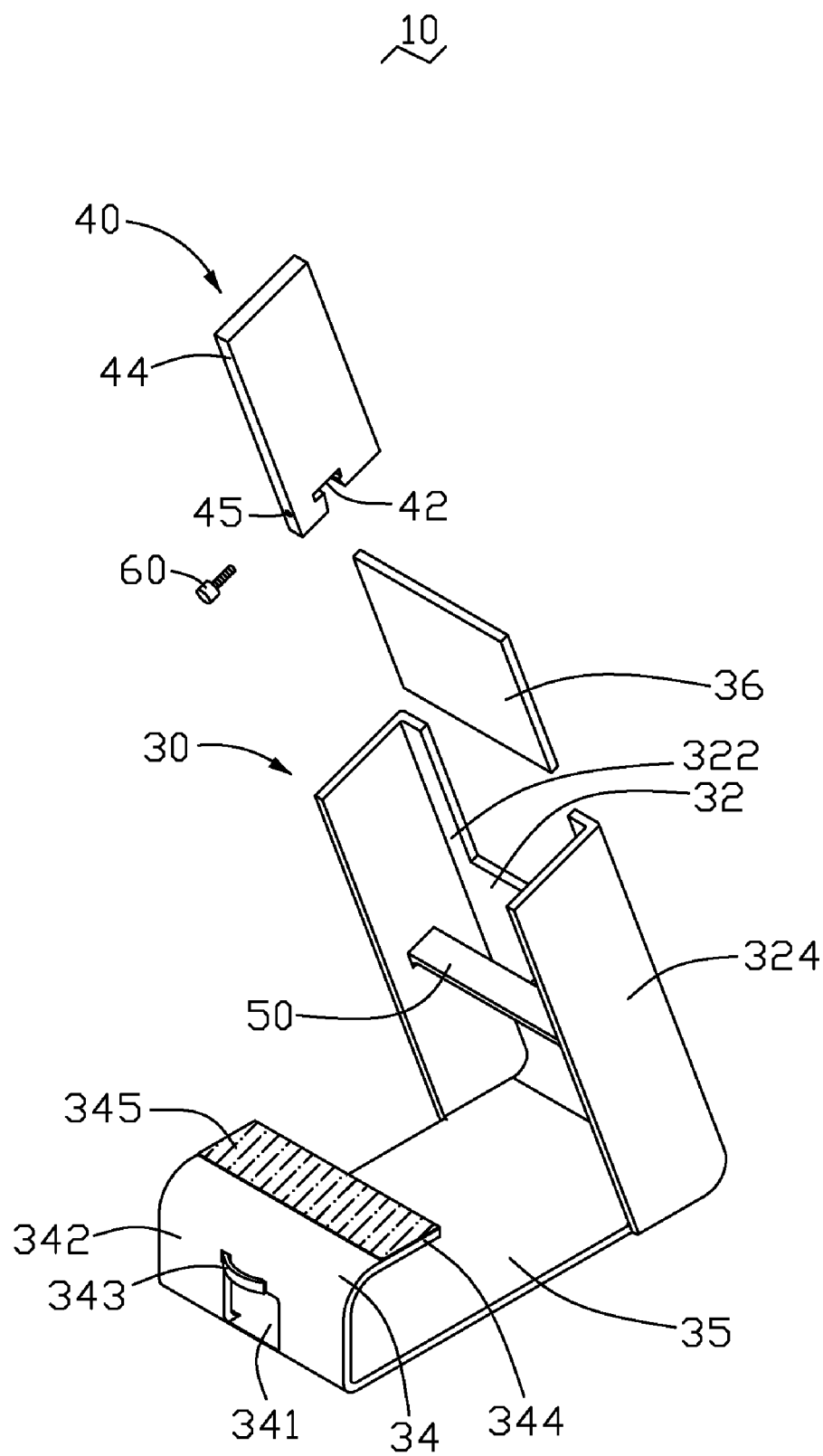
FIG. 2 is an exploded, isometric view of the stand of FIG. 1.

Referring to FIGS. 1 and 2, a stand 10 for supporting a computer enclosure 20 and a power supply 70 in accordance with an embodiment of the present invention includes a bracket 30, a securing member 40, and a support member 50.

The bracket 30 includes a bottom plate 35, a U-shaped first fixing portion 32 slantingly extending up from an end of the bottom plate 35, and a second fixing portion 34 extending up from an opposite end of the bottom plate 35. The first fixing portion 32 includes a base wall 322 slantingly extending up from the corresponding end of the bottom plate 35, and two sidewalls 324 extending toward the second fixing portion 34 from opposite sides of the base wall 322. A rectangular cutout is defined in a top portion of the base wall 322 of the first fixing portion 32 for receiving a translucent plate 36. A bridge-shaped retainer 323 (shown in FIG. 4) is formed from an inner surface of the base wall 322 at a lower portion, with a slot formed between the retainer 323 and the base wall 322. The second fixing portion 34 is generally L-shaped, and includes a connecting plate 342 extending up from the opposite end of the bottom plate 35, and a supporting plate 344 extending from a top of the connecting plate 342 toward the base wall 322 of the first fixing portion 32 and parallel to the bottom plate 35. An opening 341 is defined in the connecting plate 342 adjacent to the bottom plate 35. A bridge-shaped protrusion 343 protrudes out from the connecting plate 342 above the opening 341. A slot is formed between the protrusion 343 and the connecting plate 344. A skidproof underlay 345 is arranged on a top surface of the supporting plate 344.

The securing member 40 is generally a rectangular plate. A T-shaped sliding slot 42 is defined in a bottom end of the securing member 40. A screw hole 45 is defined in one lateral plane of the securing member 40 communicating with the sliding slot 42. The support member 50 is generally an elongated plate.

Figure 3:
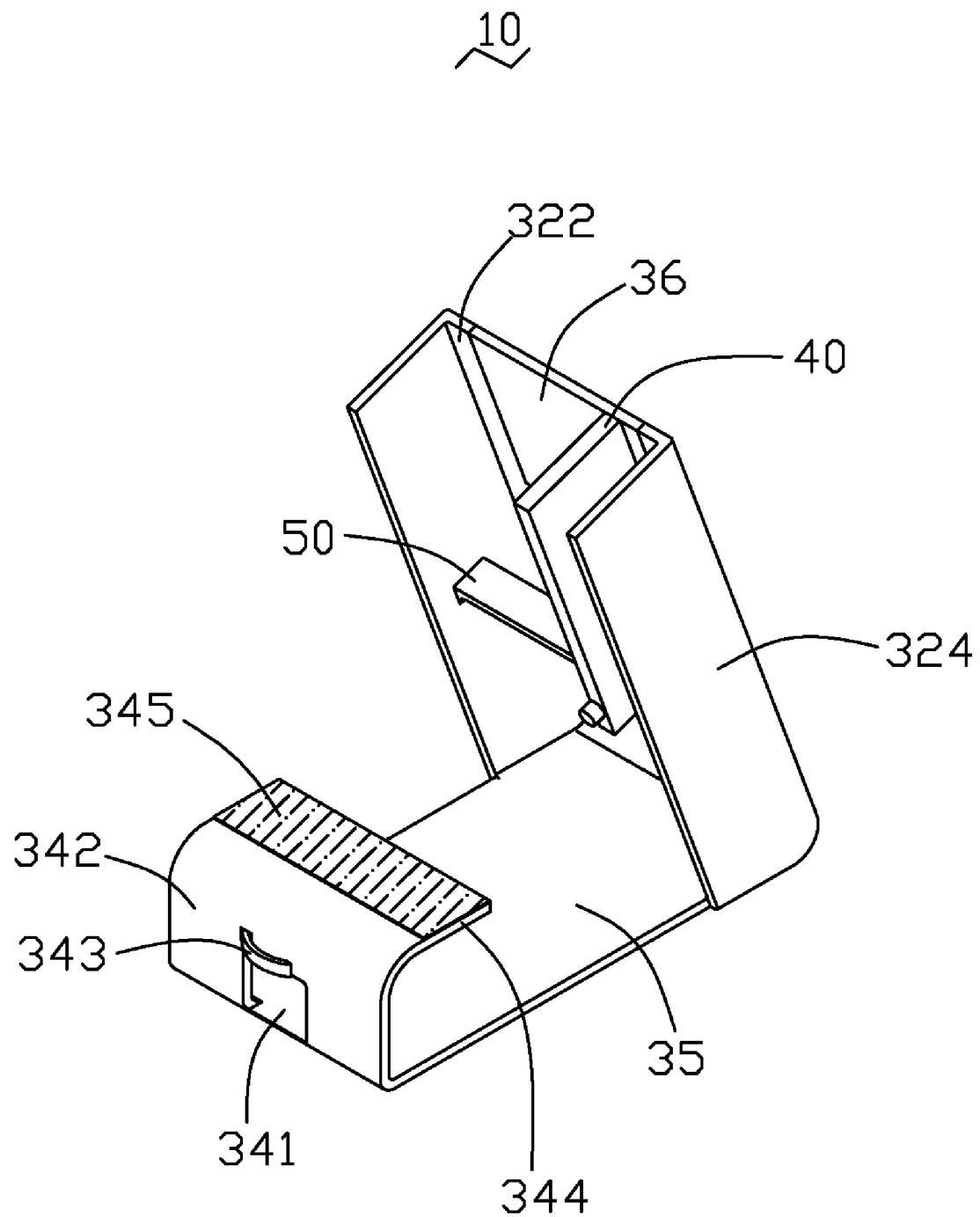
FIGS. 3 and 4 are assembled, isometric views of the stand of FIG. 2, respectively viewed from two aspects.
Figure 4:
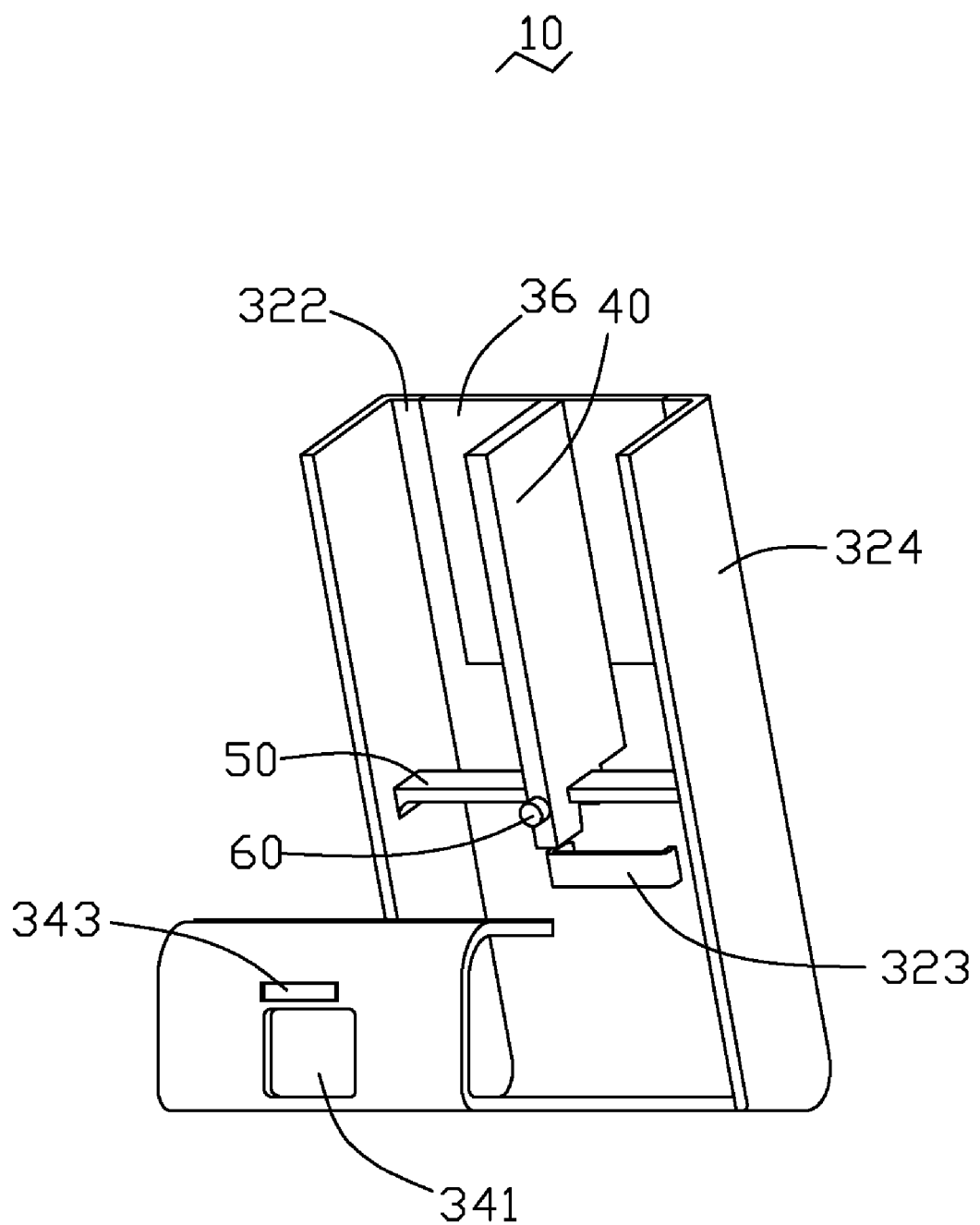

Referring also to FIGS. 3 and 4, in assembly, the securing member 40 is slidably attached to the support member 50 via the support member 50 extending through the sliding slot 42 of the securing member 40. Two ends of the support member 50 are respectively fixed to the sidewalls 324 of the first fixing portion 32 of the bracket 30. A screw 60 is screwed into the screw hole 45 of the securing member 40.

The power supply 70 functions to transform alternating current (AC) to direct current (DC), and supplies power to electronic components installed within the computer enclosure 20. One end of a DC wire 81 and one end of an AC wire 82 are electrically connectable to opposite ends of the power supply 50, respectively. The other end of the DC wire 81 is electrically connected to the computer enclosure 20. The other end of the AC wire 82 is electrically connected to an external AC electric supply.

Figure 5:
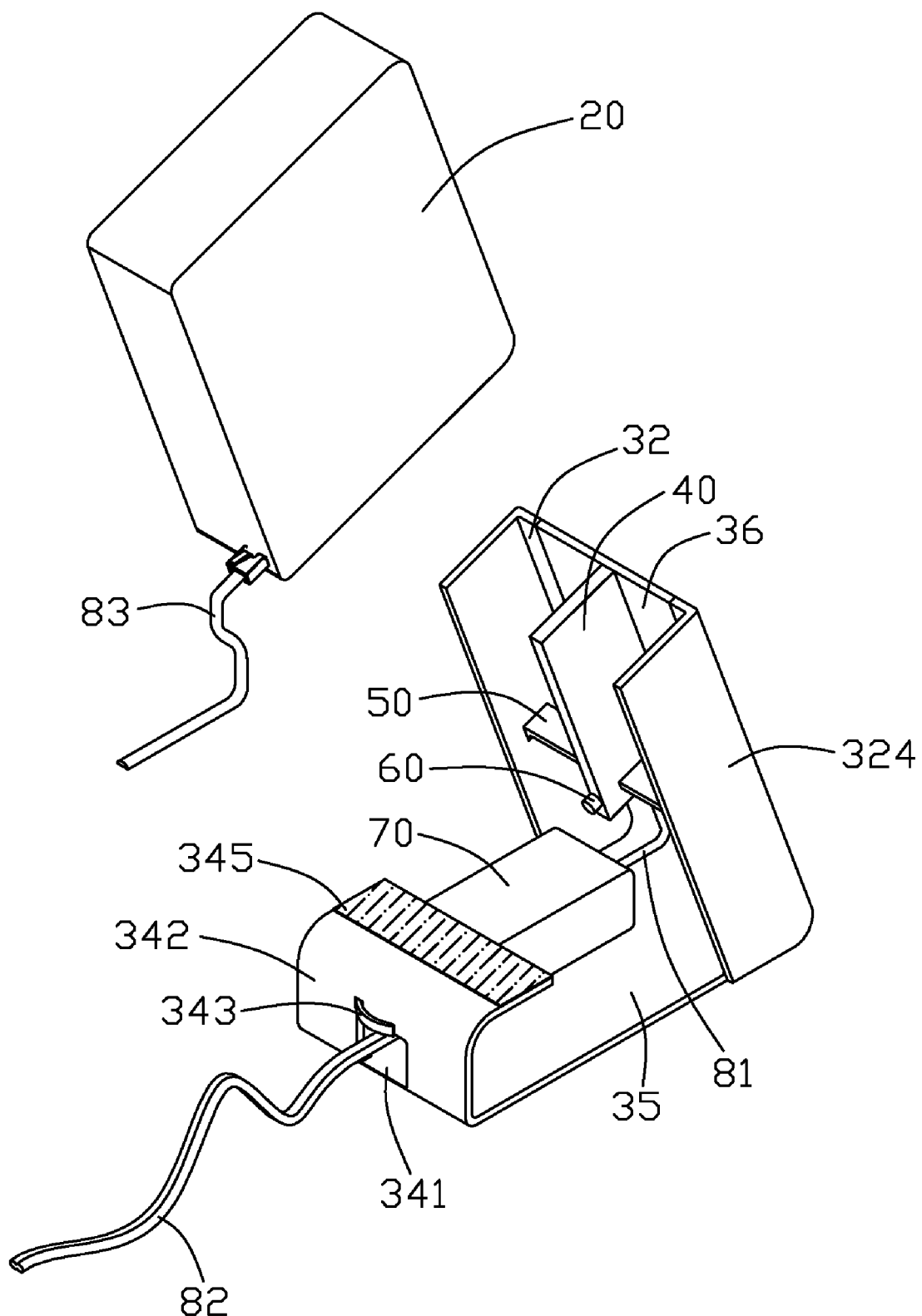
FIG. 5 is similar to FIG. 1, but showing the computer enclosure detached from the stand.

Referring also to FIG. 5, in use, the power supply 70 is supported on the bottom plate 35. The other end of the DC wire 81 extends up through the slot between the retainer 323 and the base wall 322 of the first fixing portion 32 to connect the power supply 70 to one end of the computer enclosure 40. The AC wire 82 extends through the opening 341 of the second fixing portion 34 to connect the power supply 70 to the AC electric supply. The computer enclosure 20 is slantingly placed on the bracket 30. One end connected to the DC wire 81, of the computer enclosure 20, is supported on the support member 50. One side of the computer enclosure 20 is confined by one of the sidewalls 324 of the first fixing portion 32. The screw 60 is unscrewed from the screw hole 45 and the securing member 40 is moved toward the computer enclosure 20 to abut against the other side of the computer enclosure 20. The screw 60 is then screwed into the screw hole 45 of the securing member 40 to engage with a corresponding edge of the support member 50. Thus, the securing member 40 is firmly mounted to the support member 50, and together with the sidewall 324 sandwiches the computer enclosure 20. The other end of the computer enclosure 20 is supported on the skidproof underlay 345 of the second fixing portion 34. A data wire 83 of the computer enclosure 20 extends through the slot between the protrusion 343 and the second fixing portion 34 to be electrically connected to another device. The translucent plate 36 is mounted in the cutout of the base wall 322. A plurality of indicator lights of the computer enclosure 20 is visible through the translucent plate 36.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stand for supporting a computer enclosure, comprising:
   a bracket comprising a first fixing portion and a second fixing portion at opposite ends thereof the first fixing portion comprising a first sidewall extending up and located at a side of the bracket, the second fixing portion comprising a horizontal supporting plate extending toward the first fixing portion, configured for supporting an end of the computer enclosure thereon;
   a support member perpendicularly fixed to an inner surface of the first sidewall of the first fixing portion of the bracket with one end thereof, for supporting an opposite end of the computer enclosure thereon; and
   a securing member slidably attached to the support member, and together with the first sidewall of the first fixing portion of the bracket sandwiching the computer enclosure;
   wherein the bracket further comprises a horizontal bottom plate configured to support an electronic component coupled to the computer enclosure thereon, the first and second fixing portions are formed from opposite ends of the bottom plate respectively;
   wherein the first fixing portion further comprises a base wall extending up from the corresponding end of the bottom plate and slanting toward the second fixing portion, the first sidewall extending toward the second fixing portion from one side of the base wall.

2. The stand as claimed in claim 1, wherein a cutout is defined in a top portion of the base wall of the first fixing portion, for receiving a translucent plate.

3. The stand as claimed in claim 2, wherein the first fixing portion still further comprises a second sidewall extending toward the second fixing portion from an opposite side of the base wall and parallel to the first sidewall, an opposite end of the support member is perpendicularly fixed to an inner surface of the second sidewall.

4. The stand as claimed in claim 3, wherein the securing member defines a sliding slot in a bottom thereof, the securing member is slidably attached to the support member via the support member extending through the sliding slot of the securing member.

5. The stand as claimed in claim 4, wherein a screw hole is defined in one lateral plane of the securing member and communicates with the sliding slot, a screw is screwed into the screw hole of the securing member to engage with a corresponding edge of the support member to fix the securing member to the support member.

6. The stand as claimed in claim 1, wherein a retainer is formed from an inner surface of a lower portion of the base wall with a slot formed between the retainer and the base wall, configured for allowing wires connected between the computer enclosure and the electronic component extending therethrough.

7. The stand as claimed in claim 1, wherein the second fixing portion is generally L-shaped, and further comprises a connecting plate extending up from the corresponding end of the bottom plate, and the supporting plate extends from a top of the connecting plate.

8. The stand as claimed in claim 7, wherein an opening is defined in the connecting plate adjacent to the bottom plate, configured for allowing wires of the electronic component extending therethrough.

9. The stand as claimed in claim 8, wherein a bridge-shaped protrusion protrudes out from the connecting plate above the opening, with a slot formed between the protrusion and the connecting plate, configured for allowing wires of the computer enclosure extending therethrough.

10. The stand as claimed in claim 7, wherein a skidproof underlay is arranged on a top surface of the supporting plate for supporting the computer enclosure.

11. A stand for supporting a computer that has a computer enclosure and a power supply, comprising:
    a bottom plate for supporting the power supply thereon;
    a first fixing portion extending up from one end of the bottom plate;
    a second fixing portion extending up from an opposite end of the bottom plate for supporting one end of the computer enclosure; and
    a support member mounted to the first fixing portion for supporting the other end of the computer enclosure a securing member slidably attached to the support member, and together with the first sidewall of the first fixing portion of the bracket sandwiching the computer enclosure;
    wherein the second fixing portion is generally L-shaped, and comprises a connecting plate extending up from the corresponding end of the bottom plate, and a supporting plate extending from a top of the connecting plate for supporting the one end of the computer enclosure, wherein the first fixing portion further comprises a base wall extending up from the corresponding end of the bottom plate and slanting toward the second fixing portion, the first sidewall extending toward the second fixing portion from one side of the base wall.

12. The stand as claimed in claim 11, wherein the first fixing portion comprises a sidewall for confining one side of the computer enclosure.

13. The stand as claimed in claim 12, further comprising a securing member movably mounted to the support member, configured for confining an opposite side of the computer enclosure.

14. A stand for supporting a first electronic device and a second electronic device coupled to the first electronic device, comprising:
    a bottom plate configured to support the first electronic device thereon;
    a first fixing portion extending up from one end of the bottom plate, the first fixing portion comprising a fixed sidewall fixed relative to the bottom plate and an adjustable sidewall slidable relative to the fixed sidewall together configured to sandwich two opposite sides of the second electronic device, and a supporting member fixed to the fixed sidewall configured to support one end of another side of the second electronic device; and
    a second fixing portion extending up from an opposite end of the bottom plate for supporting an opposite end of said another side of the second electronic device;
    wherein the first fixing portion further comprises a base wall extending up from the corresponding end of the bottom plate and slanting toward the second fixing portion, the fixed sidewall extending toward the second fixing portion from one side of the base wall.

15. The stand as claimed in claim 14, wherein the second fixing portion comprises a supporting plate parallel to the bottom plate, a skidproof underlay is arranged on a top surface of the supporting plate for supporting the opposite end of said another side of the second electronic device.

16. The stand as claimed in claim 15, wherein the second fixing portion further comprises a connecting plate connected between the bottom plate and the supporting plate, a bridge-shaped protrusion protrudes out from the connecting plate, and a slot is formed between the protrusion and the connecting plate configured for allowing wires of the second electronic device extending therethrough.

17. The stand as claimed in claim 14, wherein the base wall is configured to confine a side of the second electronic device different from said two opposite another sides.

18. The stand as claimed in claim 17, wherein a translucent area is defined at the base wall configured to allow the second electronic device being visible through the translucent area.

* * * * *